(12) United States Patent
Doerr et al.

(10) Patent No.: US 12,659,064 B2
(45) Date of Patent: Jun. 16, 2026

(54) CONFIGURABLE INTENSITY-MODULATION DIRECT DETECTION (IMDD) OPTICAL TRANSCEIVERS

(71) Applicant: Aloe Semiconductor Inc., Middletown, NJ (US)

(72) Inventors: Christopher R. Doerr, Middletown, NJ (US); Armond Hairapetian, Irvine, CA (US); Ying Zhao, Holmdel, NJ (US)

(73) Assignee: Aloe Semiconductor Inc., Middletown, NJ (US)

( * ) Notice: Subject to any disclaimer, the term of this patent is extended or adjusted under 35 U.S.C. 154(b) by 185 days.

(21) Appl. No.: 18/205,741

(22) Filed: Jun. 5, 2023

(65) Prior Publication Data

US 2023/0396339 A1 Dec. 7, 2023

Related U.S. Application Data

(60) Provisional application No. 63/349,017, filed on Jun. 3, 2022.

(51) Int. Cl.

| | |
|---|---|
| *H04J 14/06* | (2006.01) |
| *H04B 10/40* | (2013.01) |
| *H04B 10/50* | (2013.01) |
| *H04B 10/532* | (2013.01) |
| *H04B 10/54* | (2013.01) |
| *H04J 14/02* | (2006.01) |
| *G02B 6/293* | (2006.01) |
| *H04B 10/61* | (2013.01) |
| *H04J 14/00* | (2006.01) |

(52) U.S. Cl.
CPC .......... *H04J 14/0209* (2013.01); *H04B 10/40* (2013.01); *H04B 10/5053* (2013.01); *H04B 10/532* (2013.01); *H04B 10/54* (2013.01); *H04J 14/0213* (2013.01); *H04J 14/06* (2013.01); *G02B 6/2935* (2013.01); *H04B 10/614* (2013.01); *H04J 14/00* (2013.01)

(58) Field of Classification Search
CPC .... H04J 14/0209; H04J 14/0213; H04J 14/06; H04J 14/00; H04B 10/40; H04B 10/5053; H04B 10/532; H04B 10/54; H04B 10/614; G02B 6/2935; G02B 6/126; G02B 6/2753; G02B 6/2793
USPC ................... 398/43–103, 182–201, 202–214
See application file for complete search history.

(56) References Cited

U.S. PATENT DOCUMENTS

| | | | | |
|---|---|---|---|---|
| 5,044,715 A * | 9/1991 | Kawachi | ............... | G02F 1/3136 385/16 |
| 2008/0232816 A1* | 9/2008 | Hoshida | ................. | H04J 14/06 398/205 |
| 2010/0098411 A1* | 4/2010 | Nakashima | ............ | H04B 10/60 398/208 |
| 2011/0243556 A1 | 10/2011 | Nagarajan et al. | | |
| 2011/0293266 A1* | 12/2011 | Aoki | ................. | H04B 10/5161 398/25 |
| 2013/0058642 A1* | 3/2013 | Bouda | ................... | H04B 10/29 398/25 |

(Continued)

*Primary Examiner* — Dibson J Sanchez
(74) *Attorney, Agent, or Firm* — Fish & Richardson P.C.

(57) ABSTRACT

Implementations are directed to configurable intensity-modulation direct-detection (IM-DD) optical transceivers that are configurable between single-polarization (SP) operation and dual-polarization (DP) operation.

11 Claims, 8 Drawing Sheets

(56)             References Cited

U.S. PATENT DOCUMENTS

| | | | |
|---|---|---|---|
| 2013/0108270 A1* | 5/2013 | Zhang | H04J 14/06 |
| | | | 398/65 |
| 2013/0322881 A1* | 12/2013 | Vacondio | H04J 14/06 |
| | | | 398/65 |
| 2015/0131996 A1* | 5/2015 | Izumi | H04J 14/06 |
| | | | 398/65 |
| 2015/0139648 A1* | 5/2015 | Striegler | H04L 12/12 |
| | | | 398/65 |
| 2015/0139649 A1* | 5/2015 | Kikuchi | H04B 10/5053 |
| | | | 398/65 |
| 2017/0285373 A1 | 10/2017 | Zhang et al. | |
| 2018/0059332 A1 | 3/2018 | Mansouri Rad et al. | |
| 2019/0179064 A1 | 6/2019 | Zhang et al. | |
| 2019/0386750 A1* | 12/2019 | Wang | H04B 10/532 |
| 2020/0007263 A1* | 1/2020 | Cavaliere | H04B 10/67 |
| 2020/0319409 A1* | 10/2020 | Su | H04J 14/0209 |
| 2021/0135762 A1 | 5/2021 | Zhou et al. | |
| 2023/0396339 A1 | 12/2023 | Doerr et al. | |
| 2024/0214105 A1* | 6/2024 | Suzuki | H04B 10/614 |

* cited by examiner

CONFIGURABLE INTENSITY-MODULATION DIRECT DETECTION (IMDD) OPTICAL TRANSCEIVERS

CROSS-REFERENCE TO RELATED APPLICATIONS

This application claims the benefit of an earlier filing date and right of priority to U.S. Provisional Application No. 63/349,017, filed on Jun. 3, 2022, the disclosure of which is incorporated herein by reference in its entirety.

TECHNICAL FIELD

The present disclosure generally relates to optical transceivers.

BACKGROUND

In optical communication systems, multiplexing techniques (such as polarization-division multiplexing (PDM)) can increase communication capacity and/or photon efficiency by multiplexing different signals over different channels (e.g., different polarization modes on the same carrier frequency) for simultaneous transmission through a single fiber. However, a challenge of using PDM is that the polarization modes tend to undergo random and unpredictable rotations and losses as they propagate through an optical communication system, for example due to stress in the glass fiber (bending and twisting), ambient temperature changes, or other non-idealities in the communication system. This results in the different signals in the polarization modes becoming mixed among each other when they are received. In such scenarios, the signals must be unmixed at the receiver through multiple-input-multiple-output (MIMO) demultiplexing.

SUMMARY

Implementations are disclosed herein that relate to configurable optical transceivers. In some implementations, a configurable intensity-modulation direct-detection (IM-DD) optical transceiver is configurable between single-polarization (SP) operation and dual-polarization (DP) operation.

Various aspects of these different implementations may be modified, combined, and/or used interchangeably within the scope of this disclosure. The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

Intensity-modulation direct-detection (IM-DD) is generally the simplest and lowest-cost form of optical communication. In a direct detection system, the receiver detects only the magnitude of the received optical field (via the optical power) without requiring a local oscillator. The relative simplicity of direct detection makes it an attractive alternative to coherent detection in many scenarios.

Figures 1A, 1B:
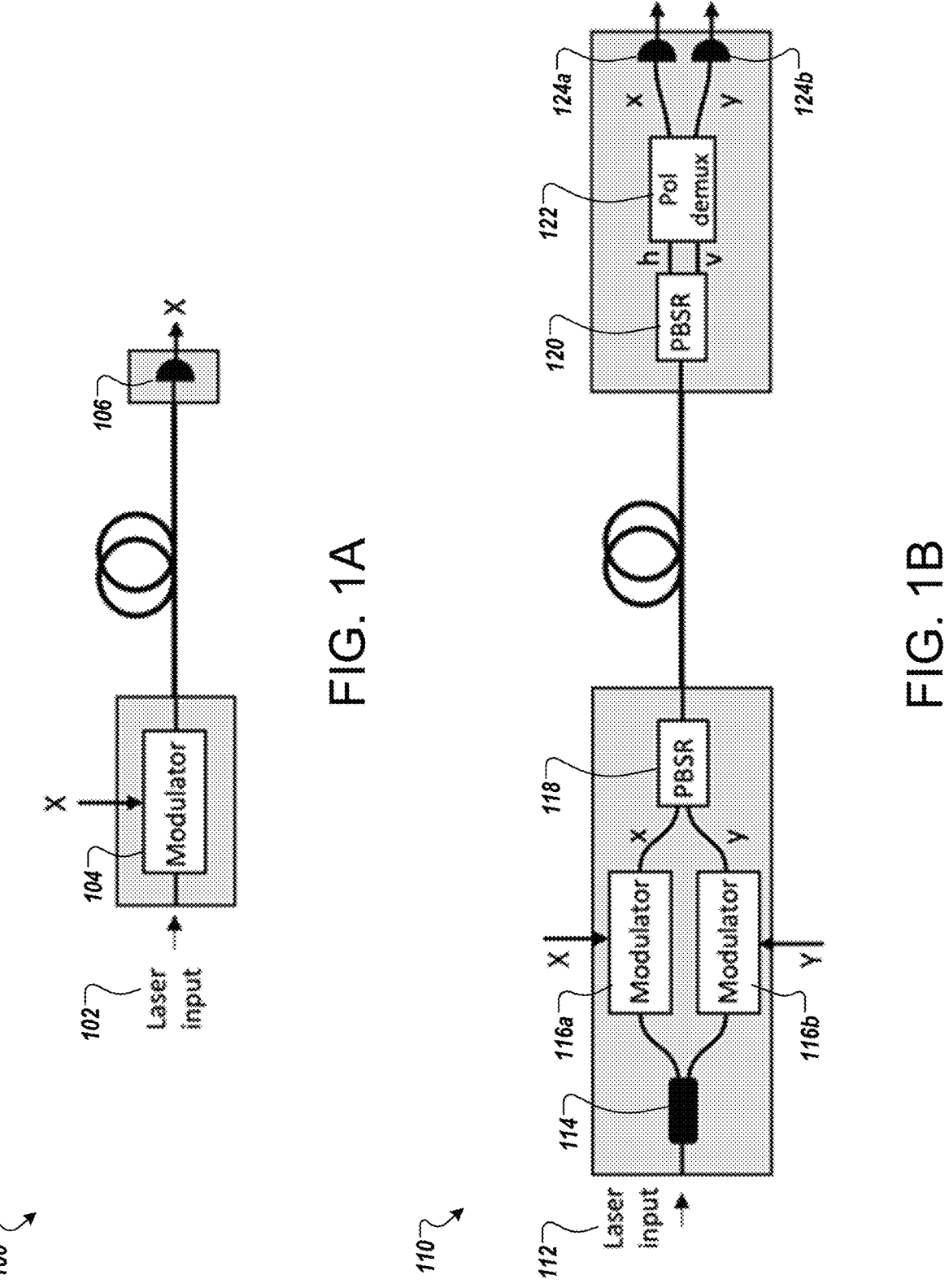
FIG. 1A illustrates an example of an intensity modulated direct detection (IM-DD) communication system that uses a single polarization mode of light.
FIG. 1B illustrates an example of a dual-polarization (DP) IM-DD communication system that uses two polarization modes of light.

An example of a transmit and receive pair in an IM-DD optical communication system is shown in FIG. 1A. The transmitter includes a light source 102, such as a laser, that generates light at a particular wavelength, and an optical modulator 104 that modulates the intensity of the light to transmit a signal X through an optical fiber. The receiver includes a photodiode 106 that detects the intensity of the received light and attempts to recover the original signal X.

The example IM-DD system in FIG. 1A utilizes only one polarization mode of light to transmit information, referred to as single-polarization (SP) communication. However, an optical fiber can support two orthogonal polarization modes. As such, a dual-polarization (DP) IM-DD communication system can leverage both polarization modes of light to transmit and receive two channels in parallel, with one channel on each polarization mode.

FIG. 1B illustrates an example of a DP-IM-DD communication system. In a DP-IM-DD communication system, two signals are multiplexed and transmitted using two different polarization modes of light, thereby doubling the data capacity. In the example of FIG. 1B, a laser input 112 is split by a splitter 114 into two modulators 116a and 116b which are modulated by respective inputs X and Y. The outputs of the modulators 116a and 116b are modulated optical signals (x and y) which are combined in a polarization-beam splitter/combiner and rotator (PBSR) 118 and transmitted over an optical fiber.

At the receiver, a polarization splitter, such as PB SR 120, splits the incoming DP-IM-DD signal into two polarization modes (h and v) which are guided into two separate waveguides and input into a 2×2 multi-input multiple-output (MIMO) polarization demultiplexer 122 to demultiplex the signals in the two polarization modes, and thereby attempt to extract the two optical signals x and y. The demultiplexed optical signals x and y are then input into photodiodes 124a and 124b to recover the original signals X and Y.

In general, multi-polarization detection is challenging because polarization states tend to drift as an optical waveform travels through a communication system (e.g., due to randomly changing birefringence in fiber transmission lines). During propagation in a non-polarization-maintaining fiber, the signals transmitted in the two polarization modes will change in polarization but remain orthogonal (in the absence of polarization-dependent loss or gain). Over a long-distance system, these random drifts of polarization can accumulate progressively without limit. In an optical communication system which uses polarization division multiplexing (PDM) to transmit different signals over the two polarization modes of light, the random and unknown polarization drifting creates challenges for a receiver to accurately detect the proper orientation of the two polarization modes, resulting in the two signals becoming mixed at the receiver (sometimes referred to as "cross-talk"). Hence, even though a signal is transmitted in one polarization mode, the signal may actually be received in both polarization modes at the receiver. In addition to polarization drift, other non-idealities in an optical communication system may degrade performance, such as polarization dependent loss (PDL), which amplifies or attenuates different polarization modes differently.

To compensate for polarization drift and other non-idealities, a multi-polarization receiver performs adaptive MIMO demultiplexing to separate and unmix the signals that are transmitted in the two polarization modes. For example, the 2×2 MIMO demultiplexer 122 in FIG. 1B can be implemented in the receiver to demultiplex the signals in the two polarization modes, and thereby attempt to extract the two original signals X and Y. The 2×2 MIMO polarization demultiplexer 122 can be implemented using various techniques, as described further below with reference to FIGS. 6 to 8. In some implementations, the 2×2 MIMO polarization demultiplexer 122 has an "endless" property such that the polarization demultiplexing can adapt to random and unpredictable rotations and losses in received polarization, without requiring any resets of the phase-shifting that would interrupt signal reception.

Figure 2:
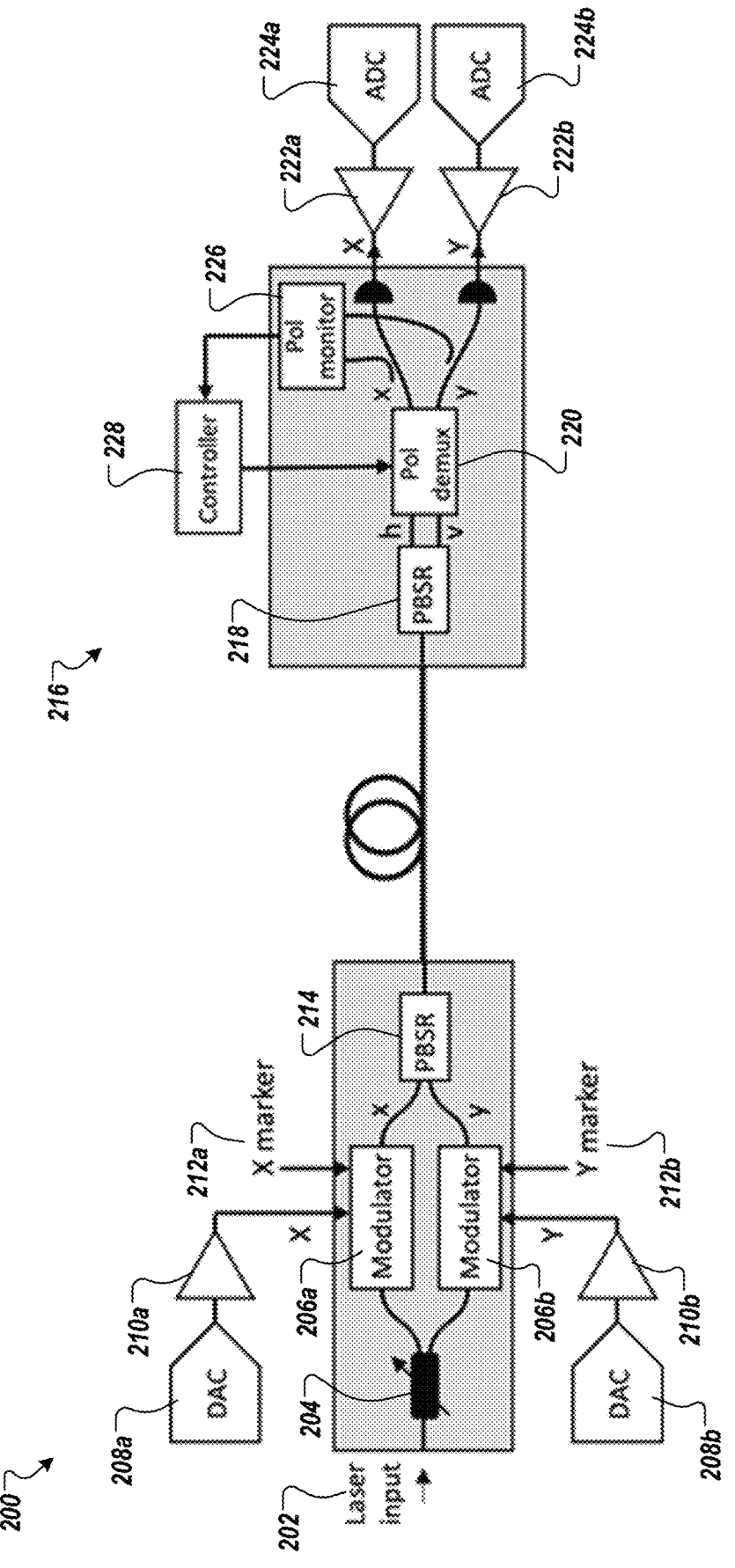
FIG. 2 illustrates an example of a configurable single-polarization (SP)-dual-polarization (DP) transceiver, according to implementations of the present disclosure.

Implementations disclosed herein are directed to transceivers that are configurable between single-polarization (SP) and dual-polarization (DP). An example implementation is shown in FIG. 2. There may be various reasons for implementing such a transceiver. For example, one reason is to enable a configurable SP-DP transceiver to communicate both with DP transceivers and well as previous-generation SP transceivers. Another reason is to enable adaptability to different link conditions and thereby optimize link performance, for example, by using SP at high baud rate for short links to save power and by using DP at half the high baud rate for long links to realize a higher chromatic dispersion tolerance.

In the example of FIG. 2, the configurable transmitter 200 includes a laser source 202 that inputs light into a variable splitter 204. The variable splitter 204 splits the laser input power to send an adjustable ratio of the laser input power into each of two waveguides that are input to two modulators 206a and 206b. The two streams of laser light are modulated by modulators 206a and 206b which are driven by signals X and Y. The signals X and Y are generated, respectively, through digital-to-analog converters (DACs) 208a and 208b and amplifiers 210a and 210b. In some implementations, unique marker signals 212a and 212b can be included, which can be tones that have different frequencies for X and Y and are added to the modulator drives.

In the configurable receiver 216, a polarization splitter, such as PB SR 218, splits the incoming DP-IM-DD signal into two polarization modes (h and v) which are guided into two separate waveguides and input into a 2×2 MIMO polarization demultiplexer 220 to demultiplex the signals in the two polarization modes, and thereby attempt to extract the two optical signals x and y. The demultiplexed optical signals x and y are then input into photodiodes to recover the original signals X and Y, which are then passed through amplifiers 222a and 222b and analog-to-digital converters (ADCs) 224a and 224b.

In some implementations, the configurable receiver 216 also includes a polarization monitor 226 that taps off optical signals from the two outputs (x and y) of the polarization demultiplexer 220. Possible implementations of the polarization monitor 226 include two photodetectors, one on each tap, or a Stokes measurement apparatus, which contains three or more photodetectors. The outputs of the polarization monitor 226 connect to a controller 228 which controls the polarization demultiplexer 220. Further details of some examples of controlling the polarization demultiplexer are described further below with references to FIGS. 6 to 8.

Figures 3A, 3B:
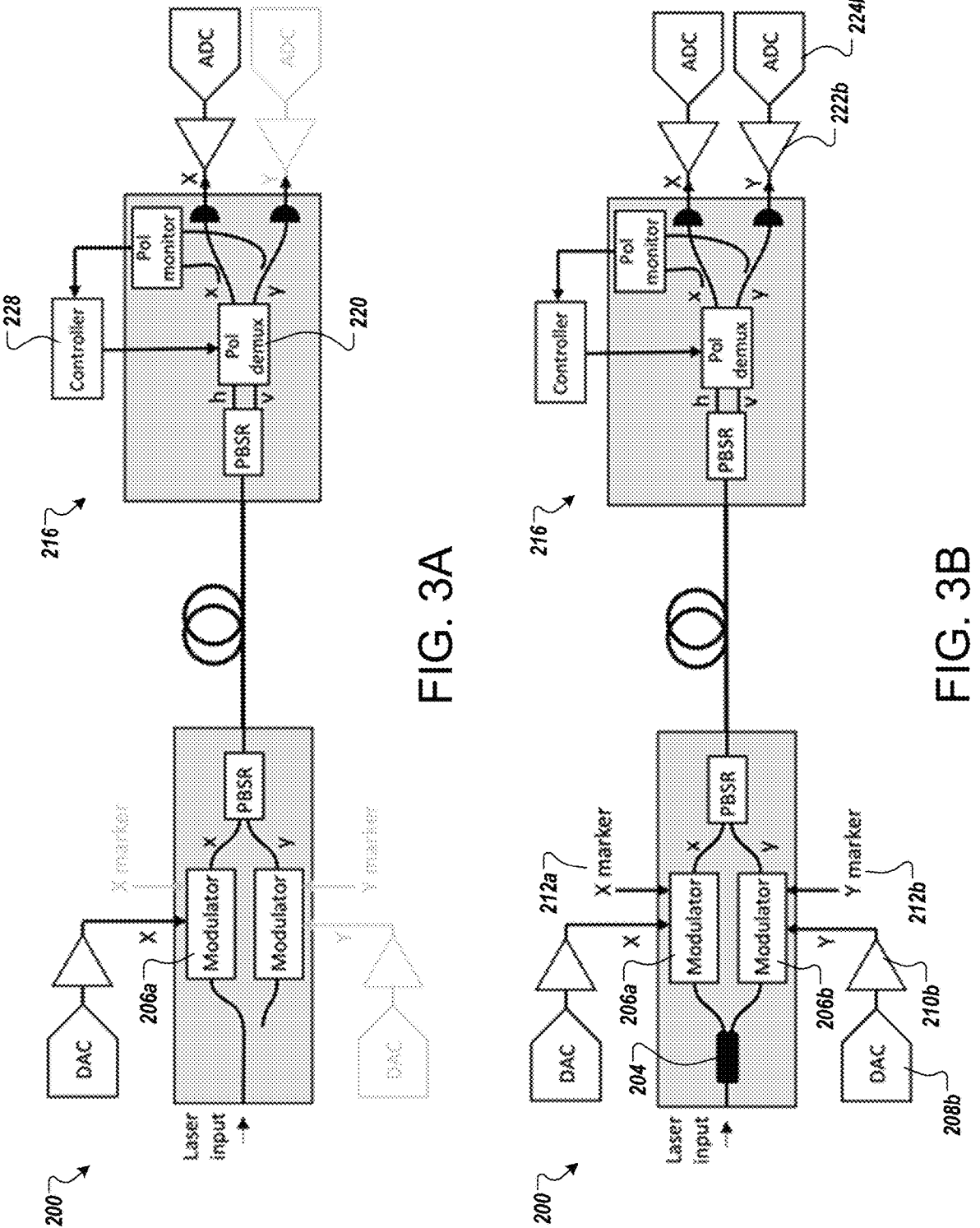
FIGS. 3A and 3B illustrate examples of a configurable transceiver that is configured as a SP transceiver (in FIG. 3A) and as a DP transceiver (in FIG. 3B)

FIGS. 3A and 3B illustrate examples of a configurable transceiver that is configured as a SP transceiver (in FIG. 3A) and a DP transceiver (in FIG. 3B). These examples illustrate how the configurable transmitter 200 and configurable receiver 216 of FIG. 2 can be adaptively configured to operate in a SP configuration or in a DP configuration.

In the SP configuration of FIG. 3A, certain components of the configurable transmitter 200 and configurable receiver 216 are not used and can be electrically powered down. For example, in the SP configuration, one of the DACs (e.g., 208b) is not required, both markers 212a and 212b are not required, and one of the ADCs (e.g., 224b) is not required. At the transmitter 200, the variable splitter 204 can be adjusted to send most of the laser light to one modulator (e.g., modulator 206a), and the markers 212a and 212b are not required because there is only one channel being used. At the receiver 216, the controller 228 can operate to maximize the optical power in only one output of the polarization demultiplexer 220 and/or to minimize the optical power in the other output of the polarization demultiplexer 220.

In the DP configuration of FIG. 3B, all the components and markers of the configurable transmitter 200 and configurable receiver 216 shown in FIG. 2 can be used. However, in some implementations, the markers 212a and 212b are not used and instead a Stokes measurement apparatus can be used. The variable splitter 204 can be adjusted to send approximately half the laser light to each modulator 206a and 206b.

Figure 4:
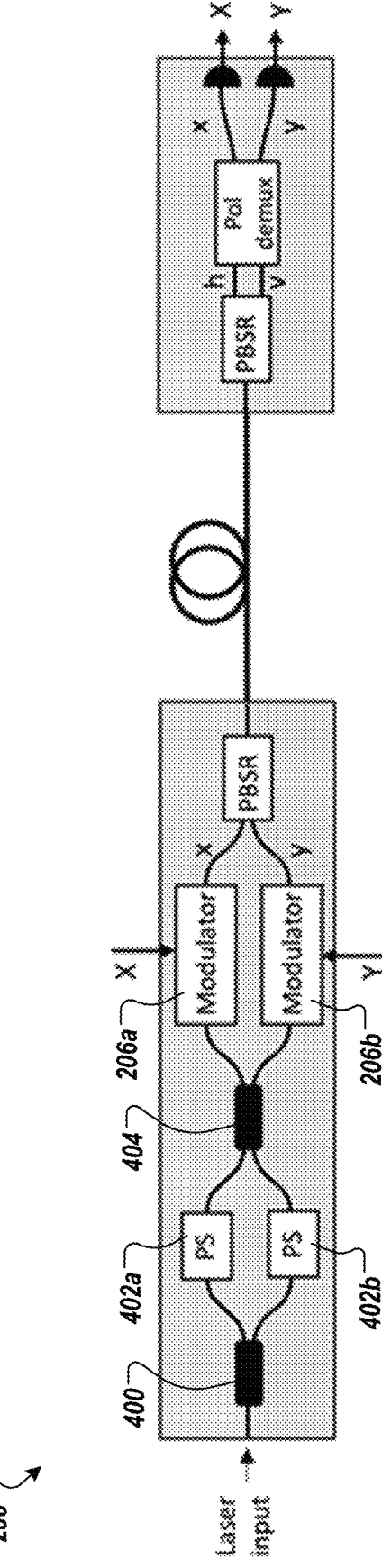
FIG. 4 illustrates an example of implementing a variable splitter in a configurable SP-DP transmitter, according to implementations of the present disclosure.

FIG. 4 illustrates an example of implementing a variable splitter (such as the variable splitter 204) in a configurable transmitter (such as the configurable transmitter 200). In this example, the variable splitter is implemented by a Mach-Zehnder interferometer (MZI) that includes two 50/50 couplers 400 and 404, and two phase shifters 402a and 402b (e.g., differential phase shifters). In general, the MZI can implement multiple stages of phase shifting.

The above-described implementations utilized dual polarization (DP) to increase transmission capacity. Data capacity can be further increased by using multiple wavelengths, where each wavelength carries a DP signal. Therefore, by using a combination of wavelength-division-multiplexing (WDM) and dual-polarization (DP), an optical communication system can transmit information using N wavelengths in two polarization modes, thereby enabling transmission of 2N times the capacity as compared to using a single wavelength in a single polarization mode.

Figure 5:
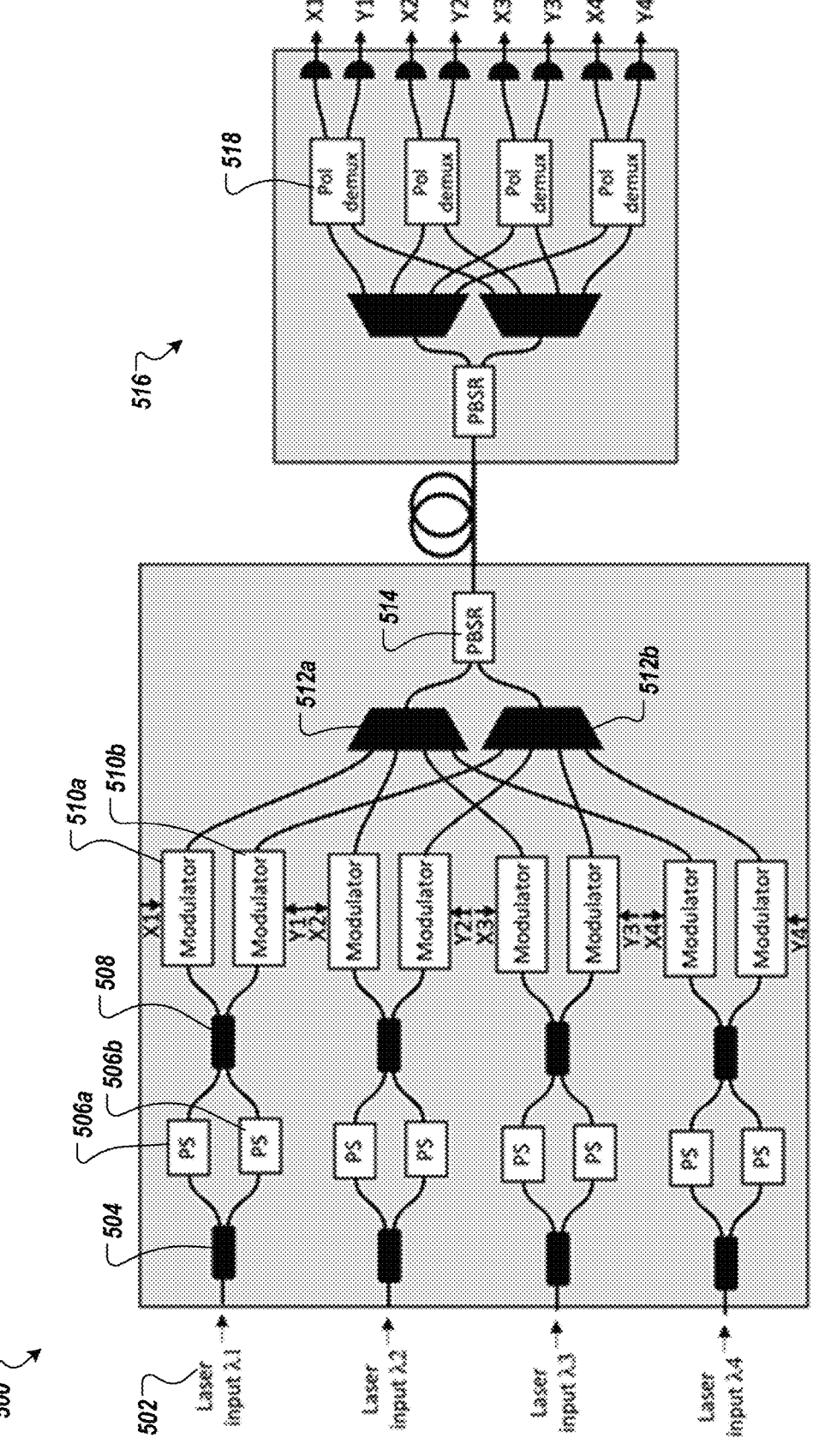
FIG. 5 illustrates an example of a four-wavelength configurable SP-DP transceiver, according to implementations of the present disclosure.

FIG. 5 illustrates an example of a four-wavelength configurable SP-DP transceiver. The implementation of the electronics and markers are not shown, merely for clarity of presentation. In this example, a 4-wavelength configurable SP-DP transmitter 500 and a 4-wavelength configurable SP-DP receiver 516 are shown. For the first wavelength ($\lambda_1$), a laser input 502 is split by a variable splitter into two modulators 510a and 510b which are modulated by respective inputs X1 and Y1. In the example of FIG. 5, the variable splitter is implemented by an MZI which includes two 50/50 couplers 504 and 508, and two phase shifters 506a and 506b (e.g., differential phase shifters), as described with reference to FIG. 4, above. The modulators 510a and 510b output modulated optical signals (x and y) in the two polarization modes, each of which is then input into respective WDM multiplexers 512a and 512b.

As such, the modulated signals in the first polarization mode for each of the 4 wavelengths are wavelength-division-multiplexed by the first WDM multiplexer 512a, and the modulated signals in the second polarization mode for each of the 4 wavelengths are wavelength-division-multiplexed by the second WDM multiplexer 512b. The resulting wavelength-multiplexed signals which are output from WDM multiplexers 512a and 512b are then combined in PBSR 514 which further multiplexes the two polarization modes of the two groups of signals for transmission over an optical fiber. As a result, the transmitter 500 can implement a combination of both wavelength-multiplexing and polarization-multiplexing.

In the example of FIG. 5, each wavelength portion of the configurable SP-DP transmitter 500 and each wavelength portion of the configurable SP-DP receiver 516 can operate as described with reference to FIGS. 3A and 3B. For example, in the configurable SP-DP transmitter 500, the first wavelength portion (corresponding to $\lambda_1$) includes the variable splitter implemented by couplers 504 and 508 and phase shifters 506a and 506b, as well as the modulators 510a and 510b, which can operate in the configurable manner described with reference to FIGS. 3A and 3B, above. Similarly, the other 3 wavelength portions can each operate in this configurable manner.

Stokes Vector Assisted Analog Polarization Demultiplexer for IM-DD Systems

Figure 6:
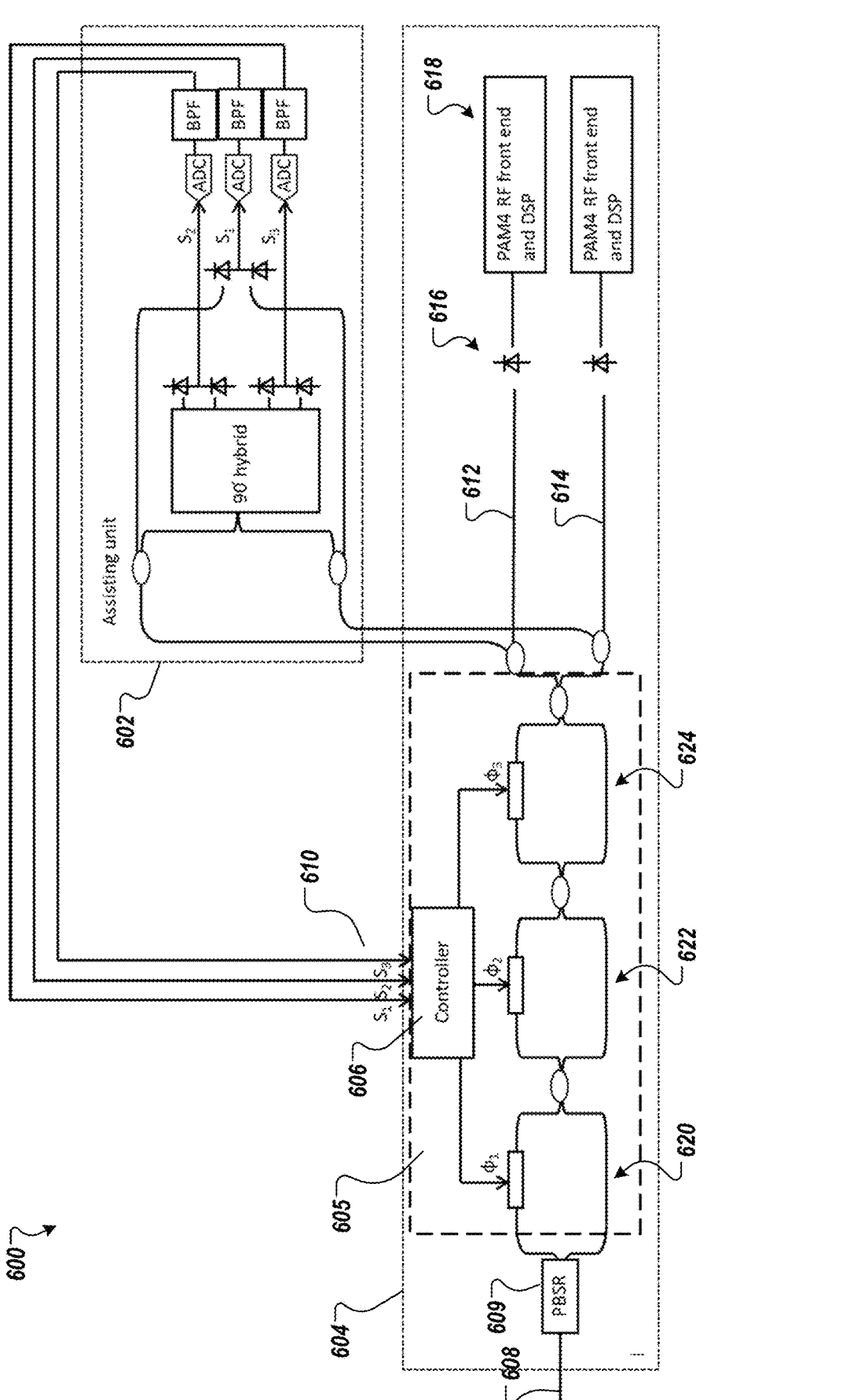
FIG. 6 illustrates an example of Stokes vector assisted optical polarization MIMO demultiplexing for an IM-DD system, according to implementations of the present disclosure.

FIG. 6 illustrates an example of Stokes vector assisted optical polarization MIMO demultiplexing for an IM-DD system.

In the example optical receiver 600 of FIG. 6, Stokes measurement apparatus 602 is implemented based on integrated optical hybrid and balanced PD to extract Stokes parameters $(S_1, S_2, S_3)$ from an optical waveform. However, other implementations of Stokes measurement apparatus 602 can be used, such as a single-end PD implementation. The extracted Stokes parameters $(S_1, S_2, S_3)$ are provided as an electrical signal 610 to a main path which is implemented by an IMDD receiver 604. In particular, the electrical signal 610 can be provided to a controller 606 of an integrated MIMO polarization demultiplexer 605 in a feedback manner. In some implementations, the bandwidth of the electrical signal 610 received from the Stokes measurement apparatus 602 is smaller than an analog bandwidth of the demultiplexed output light signals that are output from the output ports 612 and 614 of the MIMO polarization demultiplexer 605. Although the example of FIG. 6 shows a feedback structure in which the Stokes measurement apparatus 602 measures the Stokes parameters $(S_1, S_2, S_3)$ from an optical output of the MIMO demultiplexer 605, in some implementations a feedforward structure can be implemented in which the Stokes measurement apparatus 602 measures the Stokes parameters $(S_1, S_2, S_3)$ from an optical input of the optical MIMO demultiplexer 605.

In the example of FIG. 6, the controller 606 controls the integrated MIMO polarization demultiplexer 605 to perform optical polarization MIMO demultiplexing on the input light that is received through input port 608 to generate two demultiplexed output light signals that are output through output ports 612 and 614. The demultiplexed output light signals that are output through output ports 612 and 614 are then detected by photodiodes 616 to yield electrical signals which are processed by receiver circuitry 618, which can perform demodulation and various digital signal processing (DSP) operations to recover the transmitted data.

In some implementations, the Stokes measurement apparatus 602 and the MIMO polarization demultiplexer 605 share a polarization beam-splitter rotator (PBSR) 609 which splits the input light into two transmission paths. In this example, the integrated MIMO polarization demultiplexer 605 implements a 3-stage optical polarization MIMO demultiplexing structure that adaptively performs 3-stage relative phase shifting of light in the two transmission paths. Details of the 3-stage optical polarization MIMO demultiplexing structure will be described further below with reference to FIG. 8. Each of the 3 stages (620, 622, and 624) has two optical transmission paths (e.g., an upper transmission path and a lower transmission path in FIG. 6), with one phase shifter implemented in one of the optical transmission paths (or with two phase shifters implemented in push-pull configuration in both optical transmission paths) and a 2×2 coupler that combines the two optical transmission paths for the next stage. In each stage, the phase shifter controls the relative phase difference between the two optical transmission paths in that stage. Thus, the values of the three phase differences (denoted $\phi_1$, $\phi_2$, or $\phi_3$ in FIG. 6) in the three stages are applied by the corresponding phase shifter in each stage. The phase shifters can be implemented using thermo-optic (thermo-optic phase shifter, TOPS), electro-optic (electro-optic phase shifter, EOPS), or other types of phase shifters. Further details of the 3-stage phase shifting MIMO polarization demultiplexer are provided below with reference to FIG. 8.

The three phase shifters of FIG. 6 are controlled by controller 606, which determines how much phase shift ($\phi_1$, $\phi_2$, or $\phi_3$) to apply in the three phase shifting stages. In some implementations, the first phase shifter value, $\phi_1$, is a digital control, being either $\pi/2$ or $\pi/2$. The second and third phase shifter values, $\phi_2$, and $\phi_1$, can be analog controls. The operation of the controller 606 can take two factors into account: (1) fast calculating the second and third phase shifts, $\phi_2$ and $\phi_3$, based on measured Stokes parameters 610 extracted by Stokes measurement apparatus 602 from the optical outputs (612 and 614) of the demultiplexer 605, and (2) continuous demultiplexing when one of phase shifters reaches the end of its range, the so-called "endless" property of demultiplexing as described with reference to FIG. 8 below.

As a solution of factor (1), the second phase shift $\phi_2$ is calculated so as to make the three vectors $\hat{S}_n$, $\langle \hat{S} \rangle$, and $\hat{S}_3$ to be coplanar in Stokes space. The analytical expression of the coplanar condition is given by Equation 4:

$$\hat{S}_n \cdot (\langle \hat{S} \rangle \times \hat{S}_3) = 0 \qquad \text{Eq. 4}$$

where $$\hat{S}_n = T' \times \hat{S}_n(0)$$

$$\langle \hat{S} \rangle = T \times \langle \widehat{S(0)} \rangle$$

where $\hat{S}_n(0)$ and $\langle \widehat{S(0)} \rangle$ are the initial values of $\hat{S}_n$ and $\langle \hat{S} \rangle$. And rotation matrix T and T' are denoted by $$T = R_{S3}^{-1} \times R_{S1} \times R_{S3}$$

$$T' = D^{-1} \times R_{S3}^{-1} \times R_{S1} \times R_{S3} \times D$$

where $D = \begin{bmatrix} 1 & 0 & 0 & -\langle S_1(0) \rangle \\ 0 & 1 & 0 & -\langle S_2(0) \rangle \\ 0 & 0 & 1 & -\langle S_3(0) \rangle \\ 0 & 0 & 0 & 1 \end{bmatrix}$ $$R_{S3} = \begin{bmatrix} \cos(\phi_3(0)) & -\sin(\phi_3(0)) & 0 & 0 \\ \sin(\phi_3(0)) & \cos(\phi_3(0)) & 0 & 0 \\ 0 & 0 & 1 & 0 \\ 0 & 0 & 0 & 1 \end{bmatrix}$$

$$R_{S1} = \begin{bmatrix} 1 & 0 & 0 & 0 \\ 0 & \cos(\phi_2) & -\sin(\phi_2) & 0 \\ 0 & \sin(\phi_2) & \cos(\phi_2) & 0 \\ 0 & 0 & 0 & 1 \end{bmatrix}$$

As a result of Equation 4, the desired second phase shift value, $\phi_{2,opt}$, is determined by:

$$f(\sin(\phi_{2,opt}), \cos(\phi_{2,opt})) = 0 \qquad \text{Eq. 5}$$

where $f(\cdot)$ is a linear function with known parameters of $S_1(0)$, $S_2(0)$, $S_3(0)$, and $\phi_3(0)$ In some implementations, the solution $\phi_{2,opt}$ of Equation 5 can be implemented by a pre-calculated look-up table (LUT), or can be implemented using fast analytical approximation techniques.

Next, the third phase shift value $\phi_3$ is calculated to make $\langle S_1 \rangle = 0$. The desired third phase shifter value, $\phi_{3,opt}$, can be determined by:

$$\cos(\phi_{2,opt}) \cdot \langle S_2(0) \rangle' - \sin(\phi_{3,opt}) \cdot \langle S_2(0) \rangle' = 0 \qquad \text{Eq. 6}$$

where $S_1(0)'$ and $S_2(0)'$ are initial Stokes vector elements after the second phase shift $\phi_2$ adjustment.

Therefore, by solving Equation 5 and Equation 6, the demultiplexer output can meet the demultiplexing condition. In some implementations, solving the desired second and third phase values $\phi_{2,opt}$ and $\phi_{3,opt}$ analytically can provide a significant advantage because the Stokes parameters only need to be acquired once, which can greatly simplify the demultiplexing process and accelerate tracking speed. In some implementations, a progressive search algorithm can be used to solve for the desired second and third phase values $\phi_{2,opt}$ and $\phi_{3,opt}$ but in some scenarios this can require multiple acquisitions of the Stokes parameters which could result in more complexity and slow down tracking speed.

Due to the cyclical and periodic nature of phase, Equation 5 and Equation 6 have multiple solutions. For the second phase shift, the desired value $\phi_{2,opt}$ has a solution period of $2\pi$. For the third phase shift, the desired value $\phi_{3,opt}$ has a solution period of $\pi$. Taking into account the factor of endless demultiplexing control (factor 2 discussed above), the desired value of the second phase shift, $\phi'_{2,opt}$, can be selected from the multiple solutions, being limited in a practical operation range of $[-\pi, \pi]$. The desired value of the third phase shift, $\phi'_{3,opt}$, can be selected from the multiple solutions, being limited in the operation range of $[-\pi, 0]$ when the first phase shift value is $\phi_1 = \pi/2$ and in the operation range of $[0, \pi]$ when $\phi_1 = \pi/2$. Further details of endless demultiplexing control are discussed with reference to FIG. 8, below.

In some implementations, the bandwidth of the Stokes measurement apparatus (e.g., Stokes measurement apparatus 602 in FIG. 6) can be configured by balancing the Stokes vector signal-to-noise-ratio (SNR) and hardware complexity. For example, to increase Stokes vector SNR and/or avoid ambiguity, an overhead or a pilot tone can be included in the data stream to enhance low frequency strength. In some implementations, a radio-frequency (RF) bandpass filter (BPF) can be implemented as shown in FIG. 6 to select a particular signal band and to filter out noise. However, implementations of the present disclosure are not limited to implementing an overhead, a pilot tone, or a bandpass filter. In some implementations, any one or more (or none) of an overhead, a pilot tone, and/or bandpass filter schemes can be used.

MIMO Polarization Demultiplexers

Figure 7:
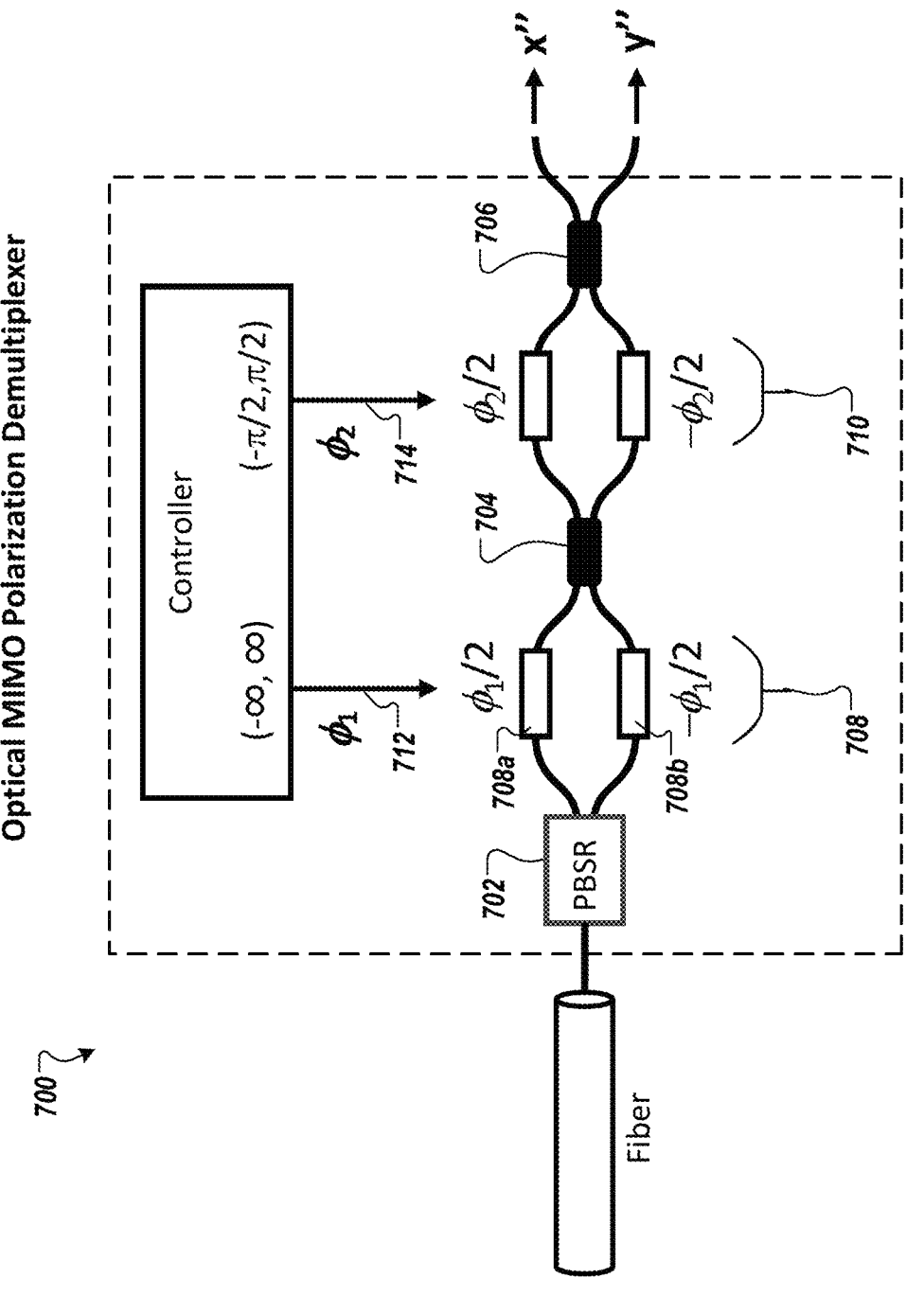
FIG. 7 illustrates an example of an optical MIMO polarization demultiplexer with two phase control signals.
Figure 8:
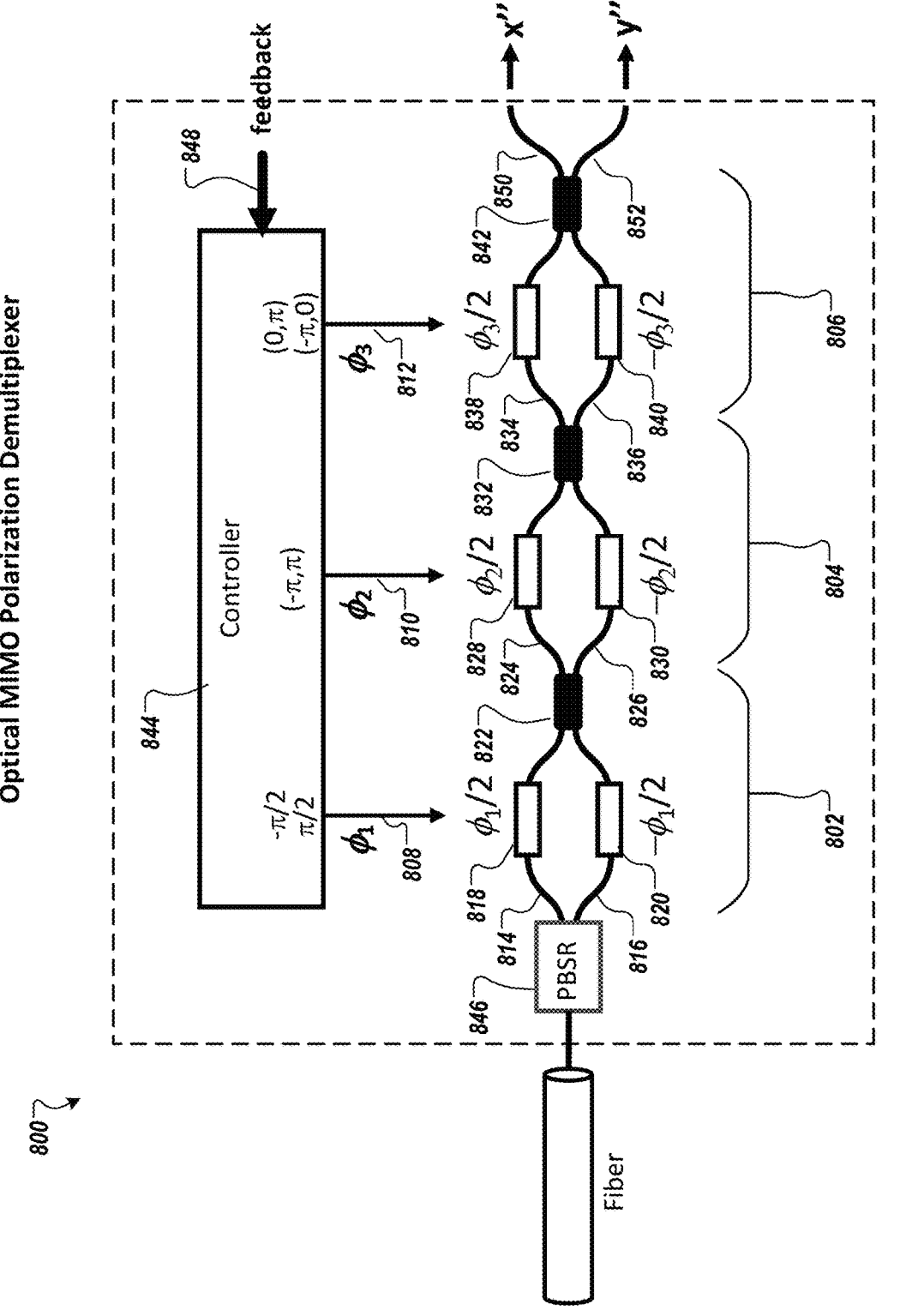
FIG. 8 illustrates an example of an optical MIMO polarization demultiplexer with three phase control signals.

FIGS. 7 and 8 illustrate examples of 2×2 MIMO polarization demultiplexers that can be implemented in optical receivers described throughout this disclosure.

FIG. 7 illustrates an example of an optical MIMO polarization demultiplexer with two control signals. Demultiplexer 700 consists of a polarization splitter and rotator (PBSR) 702, two 50/50 couplers 704 and 706, and two phase shifters 708 and 710 (e.g., differential phase shifters). The two phase shifters 708 and 710 are controlled by separate control signals $\phi_1$ (712) and $\phi_2$ (714). In the example of FIG. 7, each of the phase shifters 708 and 710 is a differential phase shifter. For example, phase shifter 708 is implemented as an interferometer with two individual phase shifting elements (708a and 708b) that adjust the optical phase in one direction in one arm of the interferometer and adjusts the optical phase in the opposite direction in the other arm. A similar structure is shown for phase shifter 710. Alternatively, in some implementations, each of the phase shifters 708 and 710 can be implemented as a non-differential phase shifter with just one phase shifting element in a single arm. The differential implementations shown in FIG. 7 has several advantages over a non-differential implementations. For example, the differential implementation has an advantage of requiring a smaller range per phase shifter. Furthermore, for a thermo-optic phase shifter, a differential phase shifter has half the worst-case power consumption as compared to a single phase shifter, and also has the benefit of constant total power consumption, which mitigates thermal transients. For purposes of this disclosure, a differential phase shifter (e.g., phase shifter 708) is considered as one phase shifter, with the understanding that it is implemented with two phase shifters (e.g., phase shifting elements 708a and 708b) but one control signal (e.g., ($\phi_1$, 712).

With this structure, the demultiplexer 700 can be represented as a matrix D (using the Mueller notation for polarization).

$$D = \begin{bmatrix} j\sin\dfrac{\phi_2}{2} & j\cos\dfrac{\phi_2}{2} \\ j\cos\dfrac{\phi_2}{2} & -j\sin\dfrac{\phi_2}{2} \end{bmatrix} \begin{bmatrix} e^{\frac{j\phi_1}{2}} & 0 \\ 0 & e^{\frac{-j\phi_1}{2}} \end{bmatrix}$$

However, the configuration of optical demultiplexer 700 in FIG. 7 has a limitation in that if the randomly drifting phase caused by the optical fiber requires that the phase control $\phi_1$ (712) continuously increases, then at some point, due to the input limitations on $\phi_1$, the phase shifter 708 must be reduced by $2\pi$ (so-called "reset"). However, during this reset, the reception of signals must be interrupted, resulting in possible loss of data and a potentially significant error burst in high-rate communications. To address this problem, a demultiplexer can implement more than two stages of phase shifters.

FIG. 8 illustrates another example of an optical MIMO polarization demultiplexer. The demultiplexer 800 can be implemented as part of a direct detection receiver. In some implementations, demultiplexer 800 is implemented via integrated photonics which can reduce cost compared to bulk optics.

The demultiplexer 800 includes three stages (802, 804, and 806) of phase shifting. Each stage is controlled by a phase shift control signal. For example, the first stage 802 is controlled by a first control signal 808, the second stage 804 is controlled by a second control signal 810, and the third stage 806 is controlled by a third control signal 812. Each control signal controls the amount of phase shift that is implemented in the respective phase shifting stage.

In the example of FIG. 8, each stage has a phase shifter and a 2×2 coupler that operate on a pair of optical transmission paths. For example, the first stage 802 has pair of transmission paths 814 and 816, optical phase shifting elements 818 and 820 (together forming a differential phase shifter), and a 2×2 coupler 822. Similarly, the second stage 804 has a pair of transmission paths 824 and 826, optical phase shifting elements 828 and 830 (together forming a differential phase shifter), and a 2×2 coupler 832. Finally, the third stage 806 has a pair of transmission paths 834 and 836, optical phase shifting elements 838 and 840 (together forming a differential phase shifter), and a 2×2 coupler 842. The 2×2 couplers in this disclosure can be, for example, implemented by directional couplers, multi-mode interference couplers, or adiabatic couplers.

Although the example of FIG. 8 shows differential implementations of phase shifters, some implementations may use non-differential implementations with just one optical phase shifting element (in one transmission path) in a stage. Throughout this disclosure, the phase difference between the two optical transmission paths (in a stage) is referred to simply as "$\varphi$," regardless of whether the phase shift is implemented by a differential phase shifter (i.e., each phase shifting element in the differential pair designed to shift by $+/-\varphi/2$, as shown in the example of FIG. 8) or implemented by a non-differential phase shifter (which shifts the phase of light in just one transmission path by an amount $+/-\varphi$ relative to light in the other transmission path). As such, the term "phase shifter" can apply to a differential phase shifter or to a non-differential phase shifter.

The phase shifters can be thermo-optic (thermo-optic phase shifter, TOPS), electro-optic (electro-optic phase shifter, EOPS), or other types. The TOPS generally have the slowest response time but can be sped up by covering with metal and/or shortening the distance to the heat sink. The power consumption of the TOPS can be reduced by having the optical transmission path pass through the heated region multiple times. The EOPS can operate on, for example, current injection, carrier depletion, or the Pockels effect. Each phase shifter could consist of multiple sections, such as a section with a phase shifter type that has a fast response time but more power consumption and a section with a phase shifter type that has a slow response time but reduced power consumption.

The three stages (802, 804, 806) of demultiplexer 800 are controlled within specific ranges or values of operations in a coordinated manner, so as to ensure that the demultiplexer 800 can achieve an "endless" property of demultiplexing without requiring a reset of any of the phase shifters. In particular, in the example of FIG. 8, the first control signal $\varphi_1$ for the first stage 802 is digital, with a value of either $-\pi/2$ or $+\pi/2$. The second control signal $\varphi_2$ for the second stage 804 can be analog or digital, operating over a continuous or discrete set of values between $-\pi$ and $+\pi$. The third control signal $\varphi_3$ for the third stage 806 can be analog or digital, operating over a continuous or discrete set of values within a range that depends on the first control signal $\varphi_1$, namely operating between 0 and $+\pi$ when $\varphi_1$ is $-\pi/2$ and operating between $-\pi$ and 0 when $\varphi_1$ is $+\pi/2$.

During operation of the demultiplexer 800, light that has traveled through a fiber first enters the splitter, such as PBSR 846, which splits the input light into the two optical transmission paths 814 and 816. The PBSR splits the input light into two polarizations and rotates one of the polarizations so that both outputs of the PBSR are in the same polarization. Thus, although path 814 contains light that was in one polarization when it entered the PBSR and path 816 contains light that was in the orthogonal polarization when it entered the PBSR, once in paths 814 and 816, the light in both paths 814 and 816 are in the same polarization. Although the example of FIG. 8 shows the splitter implemented by PBSR 846, other types of splitters can be used, including passive photonic integrated devices such as a polarization splitting grating coupler (PSGC).

The split input light enters the two optical transmission paths 814 and 816 of the first stage 802 and undergo relative phase shifts through phase shifting elements 818 and 820, such that light in one optical transmission path is phase-shifted by an amount $\varphi_1$ relative to light in the other optical transmission path. The amount of this relative phase shift $\varphi_1$ is controlled by the control signal 808. The phase-shifted light in the two optical transmission paths then enter a 2×2 coupler 822 which combines the relative phase-shifted light. This process repeats through the second stage 804 and the third stage 806, undergoing different phase shifts controlled by control signals $\varphi_2$ (810) and $\varphi_3$ (812).

A controller 844 controls the amount of relative phase shift in the three stages 802, 804, and 806 via the control signals 808, 810, and 812. In scenarios of closed-loop feedback, this control can be based on feedback information 848 which can be, for example, a measurement of an error in the received signal. Although FIG. 8 shows the controller 844 as part of the demultiplexer 800, in some implementations, the controller 844 may be implemented separately in a receiver.

An example of a specific algorithm that can be used by the controller 844 for controlling and coordinating the control signals 808, 810, and 812 will be described next. This algorithm can be used to control relative phase shifts in the demultiplexer 800.

First, light is received through a pair of MIMO inputs into a first pair of optical transmission paths (814, 816). A first optical phase shifter (e.g., differential phase shifter formed by 818 and 820) is controlled to apply a first relative phase shift between the first pair of optical transmission paths (814, 816). In some implementations, the first optical phase shifter can be controlled in a binary manner, for example with values (c+π/2) and (c−π/2), where "c" is a real number reflecting an offset. This control can be based on feedback information (e.g., using pilot tones).

Then, the first pair of optical transmission paths (814, 816) is combined with a first 2×2 optical coupler (822) to output a second pair of optical transmission paths (824, 826). A second optical phase shifter (e.g., differential phase shifter formed by 828 and 830) is controlled to apply a second relative phase shift between the second pair of optical transmission paths (824, 826). In some implementations, the second optical phase shifter can be controlled within a finite range of values that includes $-n\pi$ and $+n\pi$, where "n" is an integer. For example, this can be by analog operation within a range $(-n\pi, +n\pi)$. This control can be based on feedback information (e.g., using pilot tones).

Then, the second pair of optical transmission paths (824, 826) is combined with a second 2×2 optical coupler (832) to output a third pair of optical transmission paths (834, 836). A third optical phase shifter (e.g., differential phase shifter formed by 838 and 840) is controlled to apply a third relative phase shift between the third pair of optical transmission paths (834, 836). In some implementations, the third optical phase shifter can be controlled within a finite range that depends on the value of the first relative phase shift. For example, as described above, the third optical phase shifter can be controlled to operate between 0 and +n$\pi$ if the first relative phase shift is equal to (c−$\pi$/2), and to operate between −n$\pi$ and 0 if the first relative phase shift is equal to (c+$\pi$/2), where "n" is an integer. This can be done by analog operation within the ranges (0, +n$\pi$) and (−n$\pi$, 0). This control can be based on feedback information (e.g., using pilot tones).

Then, the third pair of optical transmission paths (834, 836) is combined with a third 2×2 optical coupler (842) to output a fourth pair of optical transmission paths (850, 852). The fourth pair of optical transmission paths (850, 852) is then output through a pair of MIMO outputs 350.

Although this algorithm was described as a specific ordering of steps, one or more of these steps can be performed in a different order. For example, the control of the first, second, and third optical phase shifters can be performed in a different order.

Through such phase-shifting algorithms, demultiplexer 800 is able to compensate for random birefringence changes which rotate the polarizations of light, caused by distortions introduced by the optical communication system. In addition to compensating for phase shifts, a demultiplexer can also be designed to compensate for other non-idealities, such as polarization dependent loss (PDL). In general, PDL may be caused by the fiber line itself, or by other elements of the communication system, such as fiber connectors, isolators, amplifiers, splitters, fiber couplers, or PB SRs. While PDL may be negligible in most short fiber-optic links, as the length of the fiber increases, PDL can have a more substantial impact on proper reception of the optical signals.

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

What is claimed is:

1. A intensity-modulation direct detection (IMDD) transmitter comprising:

a first modulator configured to modulate a first optical signal;

a second modulator configured to modulate a second optical signal; and a polarization beam-splitter rotator (PBSR) configured to receive the first optical signal and the second optical signal, and to output an output signal that is based on the first optical signal and the second optical signal, wherein the IMDD transmitter is configurable between transmitting single polarization (SP) signals and transmitting dual polarization (DP) signals, wherein the IMDD transmitter is configured to transmit DP signals by:

applying a first marker signal having a first frequency to the first optical signal, and applying a second marker signal having a second frequency to the second optical signal, wherein the first frequency is different from the second frequency, and wherein the IMDD transmitter is configured to transmit SP signals by disabling the second marker signal.

2. The IMDD transmitter of claim 1, comprising a variable splitter connected at its input to a laser and connected at its outputs to the first modulator and the second modulator.

3. The IMDD transmitter of claim 2, wherein the variable splitter comprises a Mach-Zehnder interferometer that comprises at least one phase shifter.

4. The IMDD transmitter of claim 2, wherein the IMDD transmitter is configured to transmit SP signals by controlling the variable splitter to provide a majority of light from the laser to the first modulator, and wherein the IMDD transmitter is configured to transmit DP signals by controlling the variable splitter to provide half of the light from the laser to the first modulator and half of the light from the laser to the second modulator.

5. The IMDD transmitter of claim 1, wherein the IMDD transmitter is configured to transmit SP signals by further disabling the first marker signal.

6. The IMDD transmitter of claim 1, comprising:

a first digital-to-analog converter (DAC) configured to provide a first electrical signal based on which the first optical signal is modulated; and a second DAC configured to provide a second electrical signal based on which the second optical signal is modulated, wherein the IMDD transmitter is configured to transmit SP signals by disabling the second DAC.

7. The IMDD transmitter of claim 1, comprising:

a first laser configured to output first light having a first wavelength, wherein the first modulator and the second modulator are configured to receive the first light;

a second laser configured to output second light having a second wavelength, wherein the second wavelength is different from the first wavelength;

a third modulator configured to receive the second light and modulate a third optical signal based on the second light; and a fourth modulator configured to receive the second light and modulate a fourth optical signal based on the second light.

8. The IMDD transmitter of claim 7, comprising:

a first variable splitter connected between the first laser and the first and second modulators; and a second variable splitter connected between the second laser and the third and fourth modulators.

9. The IMDD transmitter of claim 1, comprising a laser configured to provide light to the first modulator and the second modulator, wherein the first modulator and the second modulator are configured to modulate the light from the laser.

10. The IMDD transmitter of claim 9, wherein the IMDD transmitter is configured to switch between transmitting SP signals and transmitting DP signals by adjusting a relative amount of the light from the laser that is provided to the first modulator or the second modulator.

11. The IMDD transmitter of claim 9, comprising:

a first waveguide connected between the laser and the first modulator; and a second waveguide connected between the laser and the second modulator.

* * * * *